US012430183B2

(12) United States Patent
Qin et al.

(10) Patent No.: US 12,430,183 B2
(45) Date of Patent: Sep. 30, 2025

(54) SNAPSHOT BASED POOL OF VIRTUAL RESOURCES FOR EFFICIENT DEVELOPMENT AND TEST OF HYPER-CONVERGED INFRASTRUCTURE ENVIRONMENTS

(71) Applicant: Dell Products L.P., Round Rock, TX (US)

(72) Inventors: Yuxin Qin, Shanghai (CN); Xiaoyu Zhang, Shanghai (CN); Chenjie Zhou, Shanghai (CN); Xiang Chen, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 502 days.

(21) Appl. No.: 17/575,390

(22) Filed: Jan. 13, 2022

(65) Prior Publication Data
US 2023/0195534 A1   Jun. 22, 2023

(30) Foreign Application Priority Data
Dec. 21, 2021   (CN) .......................... 202111575857.2

(51) Int. Cl.
*G06F 9/50*   (2006.01)
(52) U.S. Cl.
CPC .... *G06F 9/5077* (2013.01); *G06F 2209/5011* (2013.01); *G06F 2209/505* (2013.01)
(58) Field of Classification Search
None
See application file for complete search history.

(56) References Cited

U.S. PATENT DOCUMENTS

| | | | |
|---|---|---|---|
| 2016/0342609 A1* | 11/2016 | Jibbe | G06F 16/128 |
| 2017/0371747 A1* | 12/2017 | Bortnikov | G06F 11/1658 |
| 2021/0157504 A1* | 5/2021 | Hinman | G06F 3/0649 |
| 2022/0156112 A1* | 5/2022 | Singh | G06F 11/2028 |
| 2022/0413887 A1* | 12/2022 | Asayag | G06F 9/5072 |

(Continued)

OTHER PUBLICATIONS

A. C. Azagury et al., "GPFS-based implementation of a hyperconverged system for software defined infrastructure," in IBM Journal of Research and Development, vol. 58, No. 2/3, pp. 6:1-6:12, Mar.-May 2014 (Year: 2014).*

*Primary Examiner* — Frank D Mills
(74) *Attorney, Agent, or Firm* — Jackson Walker L.L.P.

(57) ABSTRACT

A disclosed method for developing and testing a hyperconverged infrastructure (HCI) platform creates a snapshot pool with one or more virtual resource snapshots that include one or more virtual node snapshots, one or more virtual cluster snapshots, or both. The snapshot pool may be maintained with a desired quantity of the virtual resource snapshots by adjusting the composition of the snapshot pool in response to snapshot events, including an event that alters either a composition of the snapshot pool or a configuration of the HCI platform. The desired quantity of virtual resource snapshots may be determined in accordance with one or more snapshot thresholds. The snapshot thresholds may include a snapshot pertaining to a quantity of virtual node snapshots in the snapshot pool and/or a snapshot pertaining to a quantity of virtual cluster snapshots. Specifically, the threshold may include a cluster maximum and minimum and a node maximum and minimum.

20 Claims, 4 Drawing Sheets

(56) References Cited

U.S. PATENT DOCUMENTS

2023/0029616 A1\* 2/2023 Pandit .................... G06F 3/065
2023/0115045 A1\* 4/2023 Hsu ....................... G06F 21/554
                                                              726/25

\* cited by examiner

SNAPSHOT BASED POOL OF VIRTUAL RESOURCES FOR EFFICIENT DEVELOPMENT AND TEST OF HYPER-CONVERGED INFRASTRUCTURE ENVIRONMENTS

TECHNICAL FIELD

The present disclosure relates to information handlings systems and, more specifically, developing and testing various information handling system configurations.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be configured with a hyper-converged infrastructure (HCI), often using standard hardware including, as a non-limiting example, x86-based servers. In the context of a data center, as an example, HCI may be broadly defined as an information technology (IT) implementation that natively integrates all data center functions, including compute, storage, and networking, in a virtualized platform operated and monitored through a unified management console.

Developing and testing of HCI environments is inefficient at least in part because the process of building a multi-node HCI cluster is slow, even on a simulated virtual platform.

SUMMARY

In accordance with teachings disclosed herein, common problems associated with developing and testing a distributed and virtualized information handling system, such as a hyper-converged infrastructure (HCI) platform, may include creating a snapshot pool comprising one or more virtual resource snapshots, wherein the virtual resource snapshots include one or more virtual node snapshots, one or more virtual cluster snapshots, or both and maintaining the snapshot pool with a desired quantity of the virtual resource snapshots. Maintaining the desired quantity may include adjusting the composition of the snapshot pool in response to a snapshot event. For purposes of this disclosure, a snapshot may be defined as a copy of a state of a system, e.g., a virtual machine, including files and data, at a specific point in time. A snapshot event may refer to an event that alters either a composition of the snapshot pool (e.g., changes the number of available snapshots) or a configuration of the HCI platform (e.g., a change in the number of virtual resources associated with the HCI platform). The desired quantity of virtual resource snapshots may be determined in accordance with one or more snapshot thresholds. The snapshot thresholds may include a snapshot pertaining to a quantity of virtual node snapshots in the snapshot pool and/or a snapshot pertaining to a quantity of virtual cluster snapshots.

Creating the snapshot pool may include building a plurality of virtual node resources from a stable image of a single node, generating a node snapshot for each of the virtual node resources, creating a virtual cluster resource from two or more of the virtual node resources, generating a cluster snapshot of the virtual cluster resource and adding at least one snapshot, selected from the single node snapshots and the cluster snapshot, to the resource pool. Maintaining the snapshot pool may include automatically adding one or more cluster snapshots to the resource pool responsive to determining either that the number of node snapshots is less than a minimum node threshold or the number of cluster snapshots is less than a minimum cluster threshold. Adding one or more clusters may include adding a quantity of cluster snapshots, wherein the quantity is determined based on an amount by which (a) the minimum node threshold exceeds a node snapshot count and (b) the minimum cluster threshold exceeds a cluster snapshot count.

The one or more snapshot thresholds may include thresholds for a minimum quantity of cluster snapshots (cluster minimum), a maximum quantity of cluster snapshots (cluster maximum), a minimum quantity of node snapshots (node minimum), and/or a maximum number of node snapshots (node maximum). The snapshot event may be an apply snapshot event, in which a node or cluster snapshot is used to instantiate a node or cluster resource, wherein a quantity of snapshots in the snapshot pool decreases, or a release resource event, wherein a quantity of virtual resources associated with the virtual platform decreases.

When a virtual cluster resource is released, the manner in which the snapshot pool is maintained may depend upon the number of node and cluster snapshots in the snapshot pool. If the number of node snapshots and cluster snapshots is greater than the minimum and less than the maximum, maintaining the snapshot pool may include reverting the virtual cluster resource to a cluster snapshot in the snapshot pool. Prior to reverting the virtual cluster resource, a service status of the virtual cluster may be checked and, if the virtual cluster fails, the service status check, the virtual resource may be terminated. If the number of node snapshots in the snapshot pool when the cluster resource is released is below the node minimum and the number of cluster snapshots is greater than the cluster maximum, maintaining the snapshot pool may include reverting the virtual cluster resource to one or more node snapshots. If the number of cluster and node snapshots in the snapshot pool both exceed their respective maximum thresholds, maintaining the snapshot pool may include terminating the virtual cluster.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
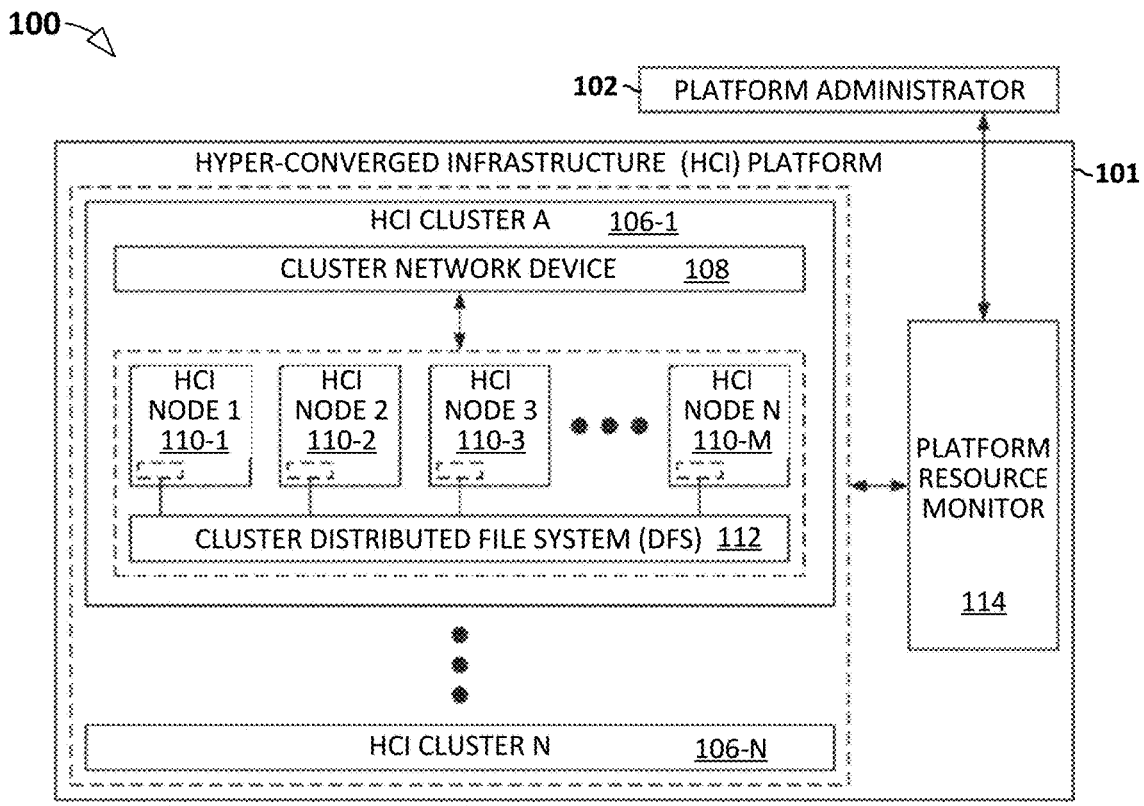
FIG. 1 illustrates a block diagram of a hyper-converged infrastructure (HCI) environment include one or more HCI clusters, each of which may include one or more HCI nodes.

Exemplary embodiments and their advantages are best understood by reference to FIGS. 1-7, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Figure 2:
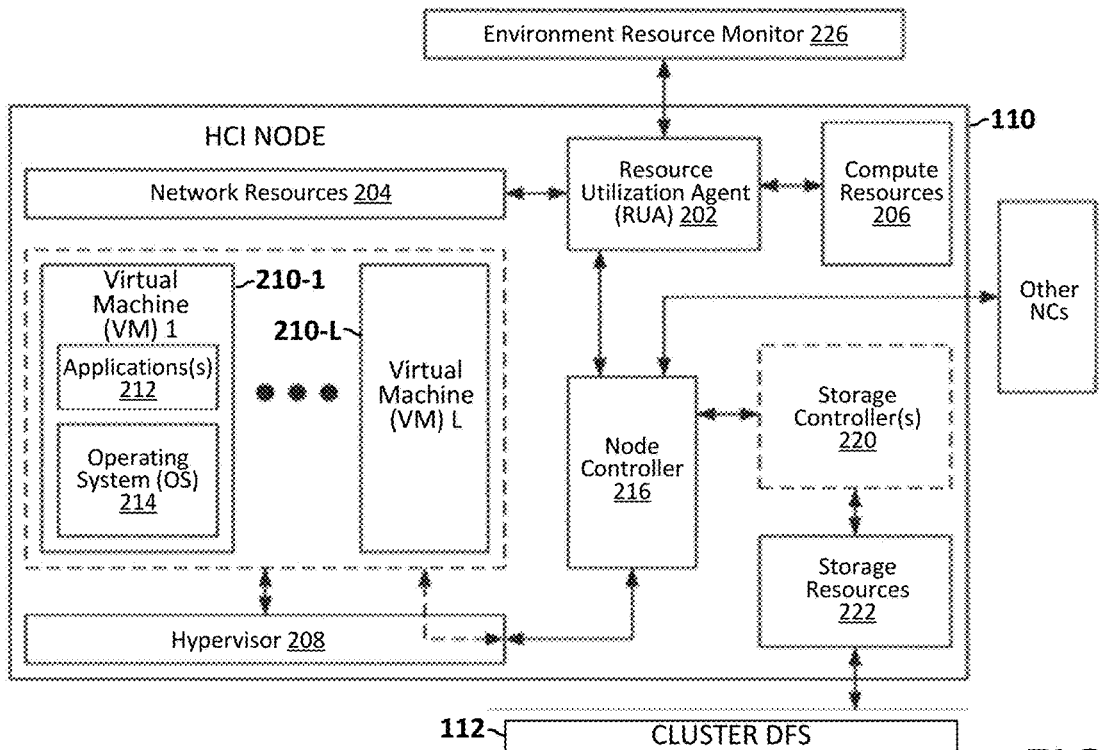
FIG. 2 illustrates elements of an HCI node.

Before describing disclosed features for monitoring and managing event messages in a distributed computing environment, an exemplary HCI platform suitable for implementing these features is provided. Referring now to the drawings, FIG. 1 and FIG. 2 illustrate an exemplary information handling system 100. The information handling system 100 illustrated in FIG. 1 and FIG. 2 includes a platform 101 communicatively coupled to a platform administrator 102. The platform 101 illustrated in FIG. 1 is an HCI platform in which compute, storage, and networking resources are virtualized to provide a software defined information technology (IT) infrastructure. Administrator 102 may be any computing system with functionality for overseeing operations and maintenance pertinent to the hardware, software, and/or firmware elements of HCI platform 101. Platform administrator 102 may interact with HCI platform 101 via requests to and responses from an application programming interface (API) (not explicitly depicted). In such embodiments, the requests may pertain to event messaging monitoring and event messaging state management described below. The HCI platform 101 illustrated in FIG. 1 may be implemented as or within a data center and/or a cloud computing resource featuring software-defined integration and virtualization of various information handling resources including, without limitation, servers, storage, networking resources, management resources, etc.

The HCI platform 101 illustrated in FIG. 1 includes one or more HCI clusters 106-1 through 106-N communicatively coupled to one another and to a platform resource monitor (PRM) 114. Each HCI cluster 106 illustrated in FIG. 1 encompasses a group of HCI nodes 110-1 through 110-M configured to share information handling resources. In some embodiments, resource sharing may entail virtualizing a resource in each HCI node 110 to create a logical pool of that resource, which, subsequently, may be provisioned, as needed, across all HCI nodes 110 in HCI cluster 106. For example, when considering storage resources, the physical device(s) (e.g., hard disk drives (HDDs), solid state drives (SSDs), etc.) representative of the local storage resources on each HCI node 110 may be virtualized to form a cluster distributed file system (DFS) 112. In at least some such embodiments, cluster DFS 112 corresponds to a logical pool of storage capacity formed from some or all storage within an HCI cluster 106.

An HCI cluster 106, and the one or more HCI nodes 110 within the cluster, may represent or correspond to an entire application or to one or more of a plurality of micro services that implement the application. As an example, an HCI cluster 106 may be dedicated to a specific micro service in which multiple HCI nodes 110 provide redundancy and support high availability. In another example, the HCI nodes 110 within HCI cluster 106 include one or more nodes corresponding to each micro service associated with a particular application.

The HCI cluster 106-1 illustrated in FIG. 1 further includes a cluster network device (CND) 108, which facilitates communications and/or information exchange between the HCI nodes 110 of HCI cluster 106-1 and other clusters 106, PRM 114, and/or one or more external entities including, as an example, platform the administrator 102. In at least some embodiments, CND 108 is implemented as a physical device, examples of which include, but are not limited to, a network switch, a network router, a network gateway, a network bridge, or any combination thereof.

PRM 114 may be implemented with one or more servers, each of which may correspond to a physical server in a data center, a cloud-based virtual server, or a combination thereof. PRM 114 may be communicatively coupled to all HCI nodes 110 across all HCI clusters 106 in HCI platform 101 and to platform administrator 102. PRM 114 may include a resource utilization monitoring (RUM) service or feature with functionality to monitor resource utilization parameters (RUPs) associated with HCI platform 101.

FIG. 2 illustrates an exemplary HCI node 110 in accordance with disclosed subject matter. HCI node 110, which may be implemented with a physical appliance, e.g., a server (not shown), implements hyper-convergent architecture, offering the integration of virtualization, compute, storage, and networking resources into a single solution. HCI node 110 may include a resource utilization agent (RUA) 202 communicatively coupled to network resources 204, compute resources 206, and a node controller 216. The node controller 216 illustrated in FIG. 2 is coupled to a hypervisor 208 that supports one or more virtual machines (VMs) 210-1 through 210-L), each of which is illustrated with an operating system (OS) 214 and one or more application program(s) 212. The illustrated node controller 216 is further coupled to storage components including zero or more optional storage controllers 220, for example, a small computer system interface (SCSI) controller, and storage components 222.

In some embodiments, RUA 202 is tasked with monitoring the utilization of virtualization, compute, storage, and/or network resources on HCI node 110. Thus, the node RUA 202 may include functionality to: monitor the utilization of: network resources 204 to obtain network resource utilization parameters (RUPs), compute resources 206 to obtain compute RUPs, virtual machines 210 to obtain virtualization RUPs, storage resources 222 to obtain storage RUPs. RUA 202 may provide some or all RUPs to environment resource monitor (ERM) 226 periodically through pull and/or push mechanisms.

Figure 3:
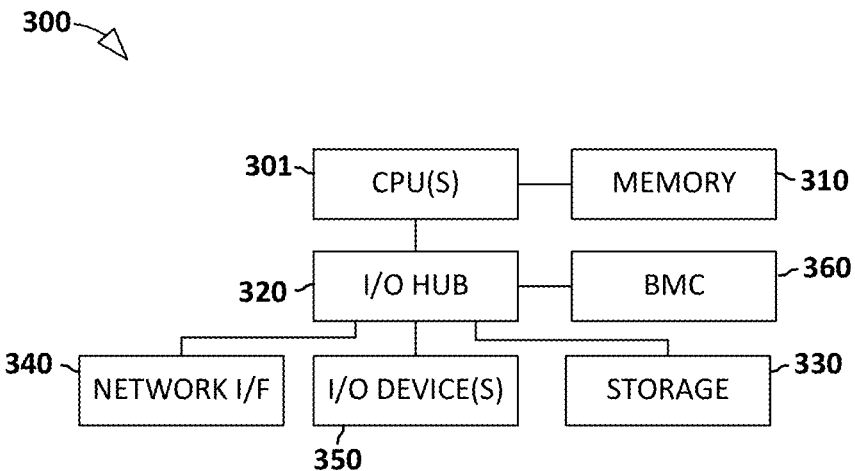
FIG. 3 illustrate an exemplary information handling system.

Referring now to FIG. 3, one or more of the HCI components illustrated in FIG. 1 and FIG. 2 may be instantiated as or within a physical resource exemplified by the information handling system 300 illustrated in FIG. 3. The illustrated information handling system includes one or more general purpose processors or central processing units (CPUs) 301 communicatively coupled to a memory resource 310 and to an input/output hub 320 to which various I/O resources and/or components are communicatively coupled. The I/O resources explicitly depicted in FIG. 3 include a network interface 340, commonly referred to as a NIC (network interface card), storage resources 330, and additional I/O devices, components, or resources including as non-limiting examples, keyboards, mice, displays, printers, speakers, microphones, etc. The illustrated information handling system 300 includes a baseboard management controller (BMC) 360 providing, among other features and services, an out-of-band management resource which may be coupled to a management server (not depicted). In at least some embodiments, BMC 360 may manage information handling system 300 even when information handling system 300 is powered off or powered to a standby state. BMC 360 may include a processor, memory, an out-of-band network interface separate from and physically isolated from an in-band network interface of information handling system 300, and/or other embedded information handling resources. In certain embodiments, BMC 360 may include or may be an integral part of a remote access controller (e.g., a Dell Remote Access Controller or Integrated Dell Remote Access Controller) or a chassis management controller.

Figure 4:
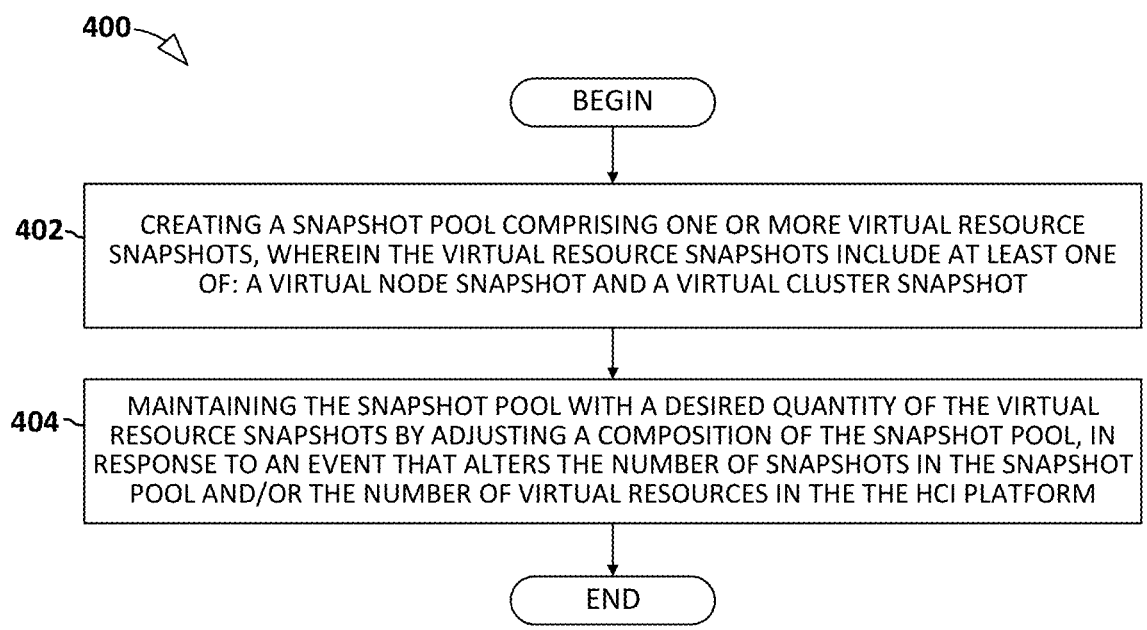
FIG. 4 is a block diagram illustrating a test and develop method for creating and using a snapshot pool for more efficient environment preparation in a test and development context.

Turning now to FIG. 4, a flow diagram illustrates a disclosed method 400 suitable for use in simulating, developing, and/or testing an HCI platform. Method 400 may be performed by any suitable management resource including any management-capable resource illustrated in FIG. 1 and/or FIG. 2. The disclosed method includes creating (operation 402) a snapshot pool comprising one or more virtual resource snapshots. The virtual resource snapshots may include one or more virtual node snapshots, one or more virtual cluster snapshots, or a combination of both. The disclosed method further includes maintaining (operation 404) the snapshot pool with a desired quantity of virtual resource snapshots by adjusting the composition of the snapshot pool, i.e., the quantity of virtual resource snapshots, in response to a snapshot event. Snapshot events include events such as an apply snapshot event that result in a reduction of the number of snapshots in the snapshot pool and an increase in the number of virtual resources in the HCI platform. Snapshot events also include events, such as release resource events, that result in a reduction of the quantity of virtual resources and, in at least some instances, an increase in the quantity of snapshots. The desired levels of snapshots may be indicated by maximum and minimum thresholds for node snapshots and cluster snapshots.

Figure 5:
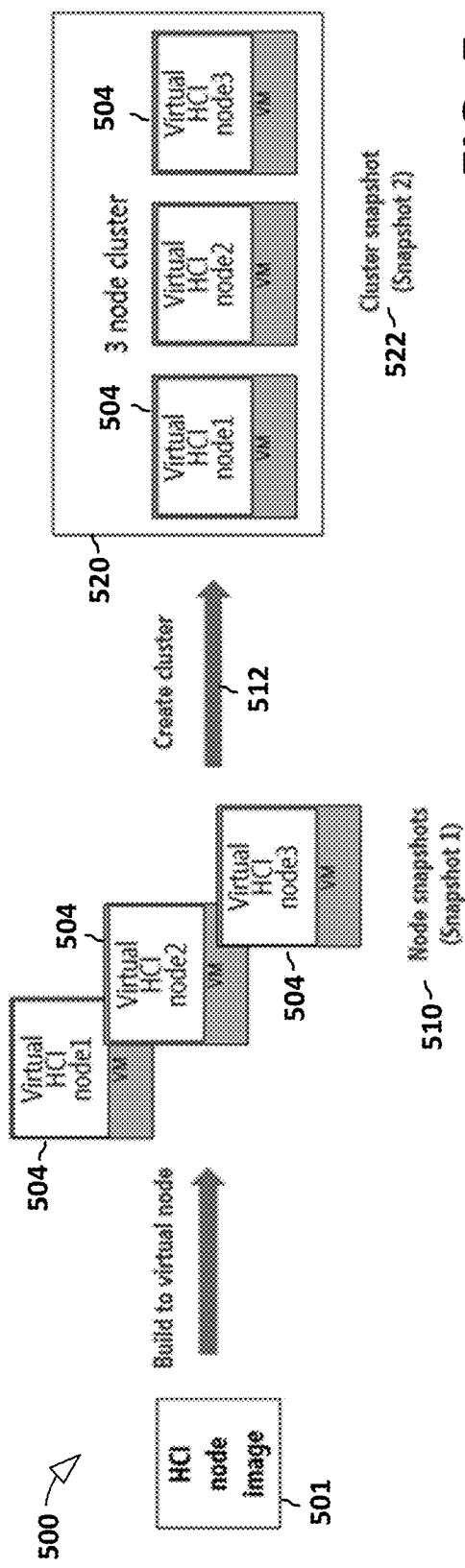
FIG. 5 illustrates a creation of a snapshot pool in accordance with disclosed teachings.

Turning now to FIG. 5, a method 500 for creating a snapshot pool is illustrated. The illustrated method 500 includes an initial build 502 of one or more virtual HCI nodes 504. The build 502 is or may be generated from a known stable image 501 of an HCI hardware node. The example illustrated in FIG. 5 includes and creates three distinct virtual node resources 504, but it will appreciated by those of ordinary skill in the field that other implementations may build more or fewer virtual node resources. As further illustrated in FIG. 5, one or more node snapshots 510, also sometimes referred to herein as a first snapshots, are taken of the one or more virtual HCI nodes 501. After the node snapshots 510 have been taken, a cluster 520 of two or more nodes 504 is created (operation 512) and a cluster snapshot 522 is taken and stored.

Figure 6:
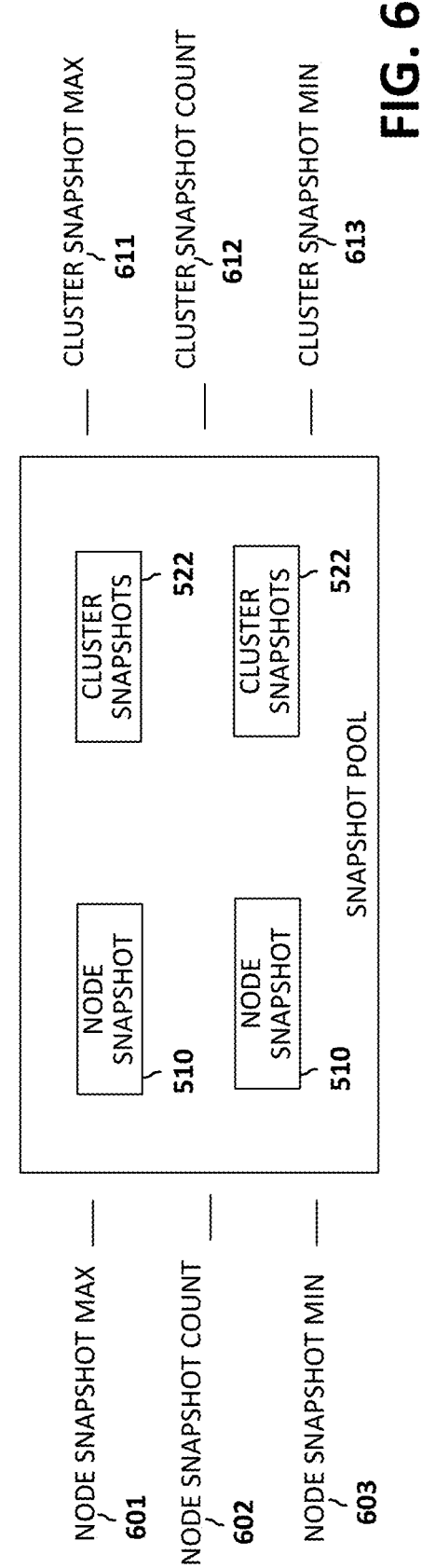
FIG. 6 illustrates an exemplary snapshot pool.

FIG. 6 is a graphical representation of a snapshot pool 600 in accordance with disclosed teachings. The snapshot pool 600 illustrated in FIG. 6 includes one or more node snapshots 510 and/or one or more cluster snapshots 522. Counts of each type of snapshot stored in snapshot pool 600 may be tracked and, in at least some embodiments, a management resource may maintain the number of snapshots stored in snapshot pool 600 in accordance with predetermined or user-defined minimum and maximum threshold values. FIG. 6 illustrates node parameters including a node snapshot maximum 601, a node snapshot count 602, and a node snapshot minimum 603 and cluster parameters including a cluster snapshot maximum 611, a cluster snapshot count 612, and a cluster snapshot minimum 613.

In at least some embodiments, the number of each type of snapshot stored in snapshot pool 600 may be controlled to maintain the number within the range between the minimum snapshot and the maximum snapshot parameters illustrated in FIG. 6. The number of snapshots stored in snapshot pool 600 may be increased or decreased in response to one or more snapshot events. Snapshot events may refer to any operation or command that results in a change in the number of node snapshots 510 or cluster snapshots 522. An exemplary implementation of managing snapshot pool 600 is illustrated and described below with respect to FIG. 7.

Figure 7:
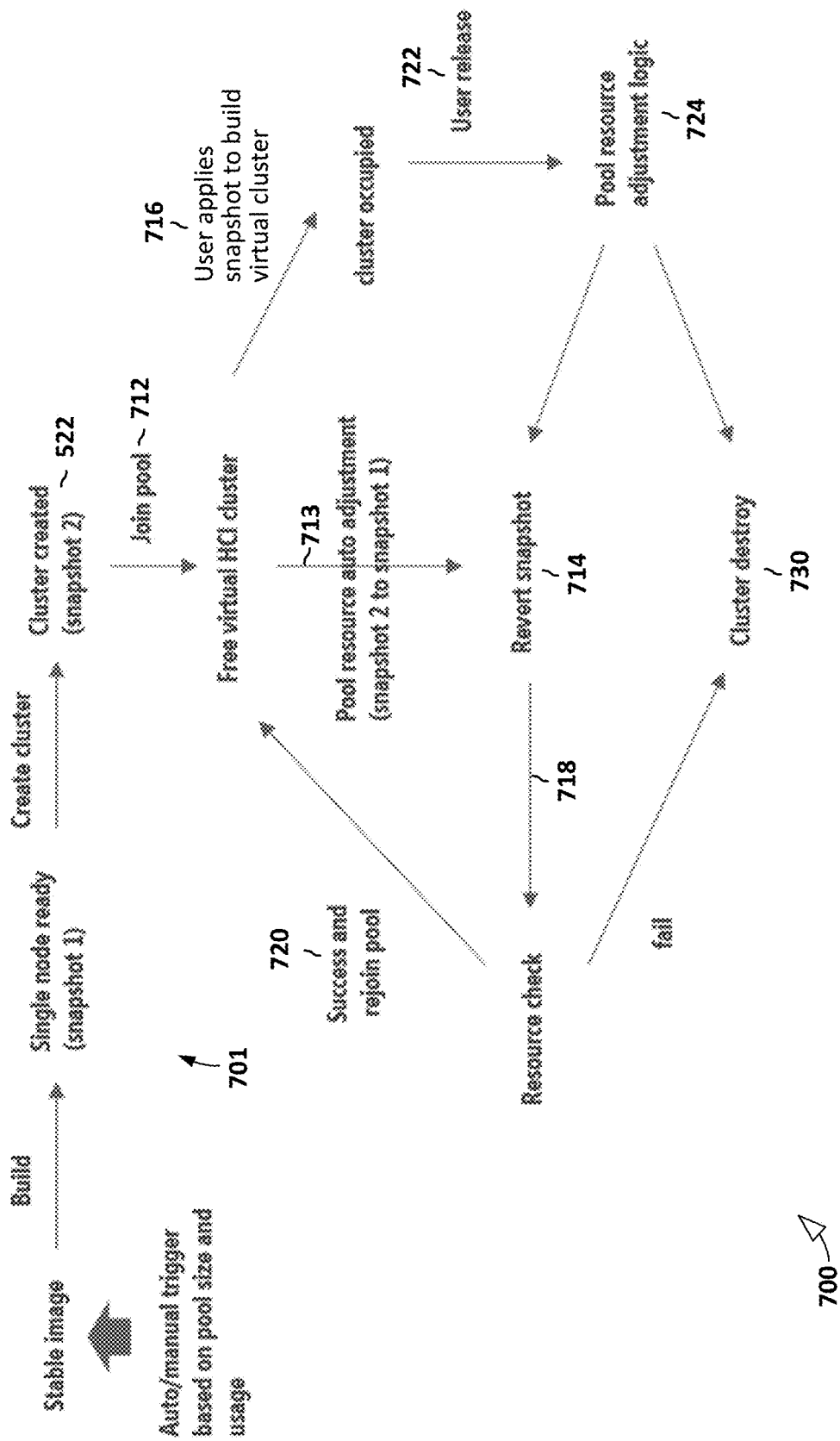
FIG. 7 illustrates an exemplary snapshot pool management method in accordance with disclosed teachings.

FIG. 7 illustrates an exemplary snapshot pool management method 700 in accordance with an embodiment of disclosed subject matter. The illustrated example of method 700 automatically or manually initiates a virtual node creation and virtual cluster creation sequence 701, analogous to the method 500 illustrated and described with respect to FIG. 5, to create a cluster snapshot 522. The illustrated sequence 701 may be triggered automatically based on the number of snapshots stored in the snapshot pool and the applicable minimum and maximum snapshots counts. As a non-limiting example, sequence 701 may be automatically triggered when the node snapshot count and the cluster snapshot count are below the respective minimum snapshot values.

The cluster snapshot 522, according to the illustrated method 700, is joined or added (operation 712) to the snapshot pool as an available virtual HCI cluster. If a user applies (operation 716) one of the cluster snapshots to create a virtual cluster on the HCI platform, the cluster snapshot count in the snapshot pool is reduced. When the user subsequently releases (operation 722) the resource from the HCA platform, snapshot pool adjustment logic 724 determines how the release of the resource is handled with respect to the snapshot pool. If the cluster count and node counts are between the minimum and maximum thresholds specified by the parameters illustrated in FIG. 6, the released resource may cause the pool resource adjustment logic to revert (operation 714) the cluster snapshot corresponding to the release cluster to the snapshot pool. If, however, the node snapshot count is below the minimum node count and the cluster snapshot count exceeds the cluster maximum snapshot, the release of the cluster resource in operation 724 may result in node snapshots, rather than the cluster snapshot, being reverted to the snapshot pool. A similar reversion to node snapshots may occur (operation 713) following the join (operation 712) of a new node cluster if the same conditions apply, i.e., if the node snapshot count is below the minimum and the cluster snapshot count exceeds the maximum cluster count. In addition, if the node snapshot count and the cluster snapshot count both exceed their respective maximum values, the release of the resource may result in the termination (operation 730) of the cluster resource without altering the snapshot pool.

After a snapshot is reverted to the snapshot pool, the snapshot may undergo a resource check in operation 718 and, if the resource check passes, the snapshot may be permitted to rejoin (operation 720) the snapshot pool. If the resource check fails, the cluster may be terminated in operation 730.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for developing and testing a hyper-converged infrastructure (HCI) platform, the method comprising:
creating a snapshot pool comprising one or more virtual resource snapshots, wherein each virtual resource snapshot indicates a state of a virtual machine, including files and data, at a particular point in time, wherein the virtual resource snapshots include at least one of: a virtual node snapshot and a virtual cluster snapshot;
responsive to detecting creation of a virtual cluster resource snapshot, adding the virtual cluster resource snapshot to the snapshot pool;
responsive to a user applying one of the virtual cluster resource snapshots to create a virtual cluster resource on the HCI platform, adjusting the composition of the snapshot pool in accordance with one or more snapshot thresholds pertaining to at least one of:
a quantity of virtual node snapshots in the snapshot pool; and
a quantity of virtual cluster snapshots in the snapshot pool.

2. The method of claim 1, wherein creating the snapshot pool comprises:
building a plurality of virtual node resources from a stable image of a single node;
generating a virtual node snapshot of each of the virtual node resources;
creating a virtual cluster resource from two or more of the virtual node resources;
generating a virtual cluster snapshot of the virtual cluster resource; and
adding at least one virtual resource snapshot, selected from the virtual node snapshots and the cluster snapshot, to the resource pool.

3. The method of claim 1, wherein adjusting the composition of the snapshot pool includes automatically adding one or more virtual cluster snapshots to the resource pool responsive to determining that:
the number of virtual node snapshots is less than a minimum node threshold; and
the number of virtual cluster snapshots is less than a minimum cluster threshold.

4. The method of claim 3, wherein adding one or more virtual resource clusters includes adding a quantity of virtual cluster snapshots, wherein the quantity is determined based on an amount by which the minimum node threshold exceeds a node snapshot count and the minimum cluster threshold exceeds a cluster snapshot count.

5. The method of claim 1, wherein the one or more snapshot thresholds include at least one of: a minimum quantity of virtual cluster snapshots, a maximum quantity of virtual cluster snapshots, a minimum number of virtual node snapshots, and a maximum number of virtual node snapshots.

6. The method of claim 5, wherein adjusting the composition of the snapshot pool includes:
an apply snapshot adjustment wherein a quantity of the virtual resource snapshots in the snapshot pool increases; and
a release snapshot adjustment wherein a quantity of the virtual resources snapshots in the virtual platform decreases.

7. The method of claim 6, wherein the release snapshot adjustment corresponds to a virtual cluster resource and wherein maintaining the snapshot pool includes reverting the virtual cluster resource snapshot to a virtual cluster snapshot in the snapshot pool.

8. The method of claim 7, wherein maintaining the snapshot pool includes, prior to reverting the virtual cluster resource:
checking a service status of the virtual cluster resource; and
responsive to the virtual cluster resource failing the service status, terminating the virtual cluster resource.

9. The method of claim 6, wherein the release snapshot adjustment corresponds to a virtual cluster resource and wherein maintaining the snapshot pool comprises reverting the virtual cluster resource to a plurality of node snapshots in the snapshot pool responsive to detecting a node snapshot count below a minimum node threshold and a cluster snapshot count above a minimum cluster threshold.

10. The method of claim 6, wherein the release snapshot adjustment corresponds to a virtual cluster resource and wherein maintaining the snapshot pool comprises terminating the virtual cluster responsive to detecting a node snapshot count exceeding a maximum node count and a cluster snapshot count exceeding a maximum cluster count.

11. An information handling system, comprising:
a central processing unit; and
a memory resource, accessible to the CPU, including processor executable instructions, wherein the instructions, when executed by the CPU, cause the information handling system to perform operations for developing and testing a hyper-converged infrastructure (HCI) platform, the operation comprising:
creating a snapshot pool comprising one or more virtual resource snapshots, wherein each virtual resource snapshot indicates a state of a virtual machine, including files and data, at a particular point in time, wherein the virtual resource snapshots include at least one of: a virtual node snapshot and a virtual cluster snapshot;
responsive to detecting creation of a virtual cluster resource snapshot, adding the virtual cluster resource snapshot to the snapshot pool;
responsive to a user applying one of the virtual cluster resource snapshots to create a virtual cluster resource on the HCI platform, adjusting the composition of the snapshot pool in accordance with one or more snapshot thresholds pertaining to at least one of:
a quantity of virtual node snapshots in the snapshot pool; and
a quantity of virtual cluster snapshots in the snapshot pool.

12. The information handling system of claim 11, wherein creating the snapshot pool comprises:
wherein creating the snapshot pool comprises:
building a plurality of virtual node resources from a stable image of a single node;
generating a virtual node snapshot of each of the virtual node resources;
creating a virtual cluster resource from two or more of the virtual node resources;
generating a virtual cluster snapshot of the virtual cluster resource; and
adding at least one virtual resource snapshot, selected from the virtual node snapshots and the cluster snapshot, to the resource pool.

13. The information handling system of claim 11, wherein adjusting the composition of the snapshot pool includes automatically adding one or more virtual cluster snapshots to the resource pool responsive to determining that:
the number of virtual node snapshots is less than a minimum node threshold; and
the number of virtual cluster snapshots is less than a minimum cluster threshold.

14. The information handling system of claim 13, wherein adding one or more virtual resource clusters includes adding a quantity of virtual cluster snapshots, wherein the quantity is determined based on an amount by which the minimum node threshold exceeds a node snapshot count and the minimum cluster threshold exceeds a cluster snapshot count.

15. The information handling system of claim 11, wherein the one or more snapshot thresholds include at least one of: a minimum quantity of virtual cluster snapshots, a maximum quantity of virtual cluster snapshots, a minimum number of virtual node snapshots, and a maximum number of virtual node snapshots.

16. The information handling system of claim 15, wherein adjusting the composition of the snapshot pool includes:
- an apply snapshot adjustment wherein a quantity of the virtual resource snapshots in the snapshot pool increases; and
- a release snapshot adjustment wherein a quantity of the virtual resources snapshots in the virtual platform decreases.

17. The information handling system of claim 16, wherein the release snapshot adjustment corresponds to a virtual cluster resource and wherein maintaining the snapshot pool includes reverting the virtual cluster resource snapshot to a virtual cluster snapshot in the snapshot pool.

18. The information handling system of claim 17, wherein maintaining the snapshot pool includes, prior to reverting the virtual cluster resource:
- checking a service status of the virtual cluster resource; and
- responsive to the virtual cluster resource failing the service status, terminating the virtual cluster resource.

19. The information handling system of claim 16, wherein the release snapshot adjustment corresponds to a virtual cluster resource and wherein maintaining the snapshot pool comprises reverting the virtual cluster resource to a plurality of node snapshots in the snapshot pool responsive to detecting a node snapshot count below a minimum node threshold and a cluster snapshot count above a minimum cluster threshold.

20. The information handling system of claim 16, wherein the release snapshot adjustment corresponds to a virtual cluster resource and wherein maintaining the snapshot pool comprises terminating the virtual cluster responsive to detecting a node snapshot count exceeding a maximum node count and a cluster snapshot count exceeding a maximum cluster count.

* * * * *